United States Patent [19]

Juenkersfeld

[11] Patent Number: 4,930,288
[45] Date of Patent: Jun. 5, 1990

[54] DEVICE FOR SEALING FOIL COVERS ONTO CONTAINERS, PARTICULARLY PLASTIC CUPS

[75] Inventor: Harald Juenkersfeld, Wuppertal, Fed. Rep. of Germany

[73] Assignee: Benz & Hilgers GmbH, Duesseldorf, Fed. Rep. of Germany

[21] Appl. No.: 191,648

[22] Filed: May 9, 1988

[30] Foreign Application Priority Data

May 8, 1987 [DE] Fed. Rep. of Germany ....... 3715356

[51] Int. Cl.⁵ ............................................... B65B 7/28
[52] U.S. Cl. ..................................... 53/329; 53/367; 156/583.1
[58] Field of Search ................ 53/300, 329, 330, 341, 53/360, 361, 362, 367, 368, 373, 387, 487; 156/69, 583.1, 583.3, 583.7, 583.9, 583.91

[56] References Cited

U.S. PATENT DOCUMENTS

| | | |
|---|---|---|
| 3,243,934 | 8/1962 | Kinney . |
| 3,248,851 | 10/1962 | Ford . |
| 3,452,513 | 7/1969 | Owens ................................. 53/329 |
| 3,729,897 | 8/1971 | Howe . |
| 3,946,650 | 3/1976 | Solberg et al. .................... 53/367 X |
| 4,282,699 | 8/1981 | Embro .............................. 53/300 X |
| 4,297,161 | 10/1981 | Graffin ............................. 156/69 X |
| 4,707,213 | 11/1987 | Mohr et al. ...................... 53/329 X |

*Primary Examiner*—Lowell A. Larson
*Assistant Examiner*—Linda B. Johnson
*Attorney, Agent, or Firm*—Klein & Vibber

[57] ABSTRACT

The invention relates to an improved sealing head for sealing a cover made of a foil material onto a packaging container, in particular a plastic cup. The sealing operation is carried out by means of a heatable sealing head. This sealing head includes an insulating body which provides for the compensation of form and position deviation between the sealing head and the plastic cups which are to be sealed. This insulating body simultaneously provides for the thermal insulation between the sealing head, on the one hand, and the drive arrangement, on the other hand. Thereby a flaw-free sealing is achieved and any down-times due to malfunctioning of the arrangement are substantially reduced.

9 Claims, 2 Drawing Sheets

DEVICE FOR SEALING FOIL COVERS ONTO CONTAINERS, PARTICULARLY PLASTIC CUPS

BACKGROUND OF THE INVENTION

The invention relates to an arrangement for sealing foil covers onto packaging containers, particularly plastic cups by means of a heatable sealing head which supports a formatting part. This sealing head includes a driving mechanism for reciprocally moving the sealing head in the direction of the packaging container. The arrangement also includes a compensation mechanism which is mounted between the sealing head and the driving mechanism and which includes at least one thermal insulating element.

Sealing arrangements of the aforedescribed type are used in many ways in the packaging industry, e.g., they are used in conjunction with plastic cups or deep drawn packages which are sealed by means of aluminum foil covers. In such an arrangement, the sealing lacquer is applied to the aluminum foil, and the foil cover is, by means of pressure and heat, securely joined to the top edge so as to form a tightly sealed joint between the aluminum foil cover and the plastic cup edge. A flaw-free sealing and thereby a tight seal of the plastic cup, respectively deep-drawn package, is, however, only then provided when a uniform pressure distribution is present during the sealing operation.

This result can only be achieved when the sealing head, respectively the formatting member connected thereto, on the one hand, and the packaging container, respectively plastic cup, on the other hand, are precisely mutually aligned in the actuating direction as well as in elevation. These two parts must be mutually coordinated with each other. As a result of unavoidable dimension deviations with packages and plastic cups and the transport mechanism which feeds them to the sealing station, such as, e.g., a cellular sheet metal member or a round table, more or less large form and weight deviations occur, which, relative to the sealing head, must be compensated. A sealing arrangement, which has become well known in the art, provides for an axial compensation by means of a spherical head and a spherical cup which is arranged between the sealing means, on the one hand, and the driving mechanism on the other hand. Such an arrangement also includes prestressed springs arranged between the two parts that are to be actually compensated. The required elevation compensation is achieved with the coil springs mounted in the drive member. Such a compensation mechanism requires a total of nearly thirty individual parts, in order to furnish the required axial and elevation compensation. To this must be added that, despite the arrangement of a plurality of thermal insulating elements, a relatively high heat loss occurs by radiation from the sealing head which operates at a temperature of 280° C. Thereby the spherical head and spherical cup are exposed to a relatively hot zone and are therefore highly thermally loaded. The incomplete thermal insulation between the sealing head and the drive mechanism requires also particular care during maintenance. It has been attempted to maintain the parts forming the assembly during the heating within supportable limits by means of water cooling. However, there is a relatively small constructional space available for such cooling, so that the cooling effect is limited. In no case is it possible, due to the required connection between the sealing head and the compensation mechanism, to provide an inner cooling of the sealing head

SUMMARY OF THE INVENTION

It is an object of this invention to provide a suitable arrangement of the aforedescribed type for sealing of foil covers on packaging containers, in particular plastic cups. The arrangement of the invention is capable of producing packaging containers, respectively plastic cups, in an inexpensive and simple manner by providing a compensation mechanism that provides for a thermal insulation which affects the form and positioning deviations received by the compensation mechanism by providing a flaw-free sealing and a preponderantly malfunction-free operation of the device.

This object is obtained by means of the arrangement of the invention in that the compensation mechanism and the insulating elements are formed by means of a common insulating body. The arrangement of this invention makes it possible to obtain, by means of a single structural element, the required axial compensation and length, respectively elevation compensation, and the insulation in an optimum manner. Besides obtaining a reduction of the heretofore required individual parts from nearly thirty into a single construction element, there results, by means of the optimum insulation from a temperature range of 220°-280° to 30°, the possibility to construct the entire arrangement in a much simpler manner.

This object is essentially effected by the fact that the insulating body has a middle support part and two receiving parts disposed at opposite ends, one of which is joined to the sealing head and the other is joined to the driving mechanism. The insulating body can be made unitary, i.e., in one piece, e.g. by means of an injection moulding process. This insulating body is in cross-section substantially double-T-shaped, whereby the middle support part is in the form of a shaft and the receiving parts are in the form of plates. The material for the insulating body most suitable is a synthetic material, preferable an amide-imide-polymer.

The insulation body can also be made of a plurality of parts, e.g., of parts consisting of two receiving plates which are formed by round parts and a middle round rod which, by means of a shrink-fit, is pushed into coaxial bores of the round parts. Summarizing, the insulating body is constructed in such a way, e.g., by means of a relatively large diameter, so that the receiving plate which is arranged on the drive mechanism has, relative to the length of the support part, a substantially larger heat loss producing surface, than the corresponding tranfer cross-section. There is therefore achieved a reduction of the average temperature of the sealing head from 240° to 30° C. in conjunction with the good insulation coefficient of the polymer in the region of the drive mechanism.

The shaping of the receiving portion of the drive mechanism in the form of a plate improves the spring-properties of the material and unburdens, by means of the improved stress distribution, the plug connection between the support part and the receiving parts. The receiving plate, which is arranged on the sealing head, which is selected in dependency of the format of the plastic cup, respectively packages, which are to be produced, is directly joined with the rear side of the sealing head and thereby is not available as a spring element.

The shaft-like construction of the middle support part of the insulating body makes possible, as a result of being bent through, a lateral deviation of the sealing, respectively a skewed position relative to the axis of movement up to 4°. During testing, the support part was bent 8° under pressure of 300 Kp several times without its functioning being inhibited in any way.

Since only machine turned parts are used for the insulating body, a simple manufacture is not only possible, but also considerable savings in costs and in mounting time result. Thereby there is achieved a significant simplification of the construction of the compensation mechanism which has as a consequence that no malfunction disturbances occur due to one part. Moreover, lubrication and down-time are eliminated. Since, moreover, no significant heating of the drive mechanism occurs, a water cooling by means of the pertinent conduits, pumps and controls is completely eliminated. The inventive arrangement provides a very simple construction, which also makes for a better connection between the sealing head and the insulation body proper.

BRIEF DESCRIPTION OF THE DRAWING

With these and other objects in view, which will become apparent in the following detailed description, the present invention will be clearly understood, in connection with the accompanying drawing in which.

DETAILED DESCRIPTION

Figure 1:
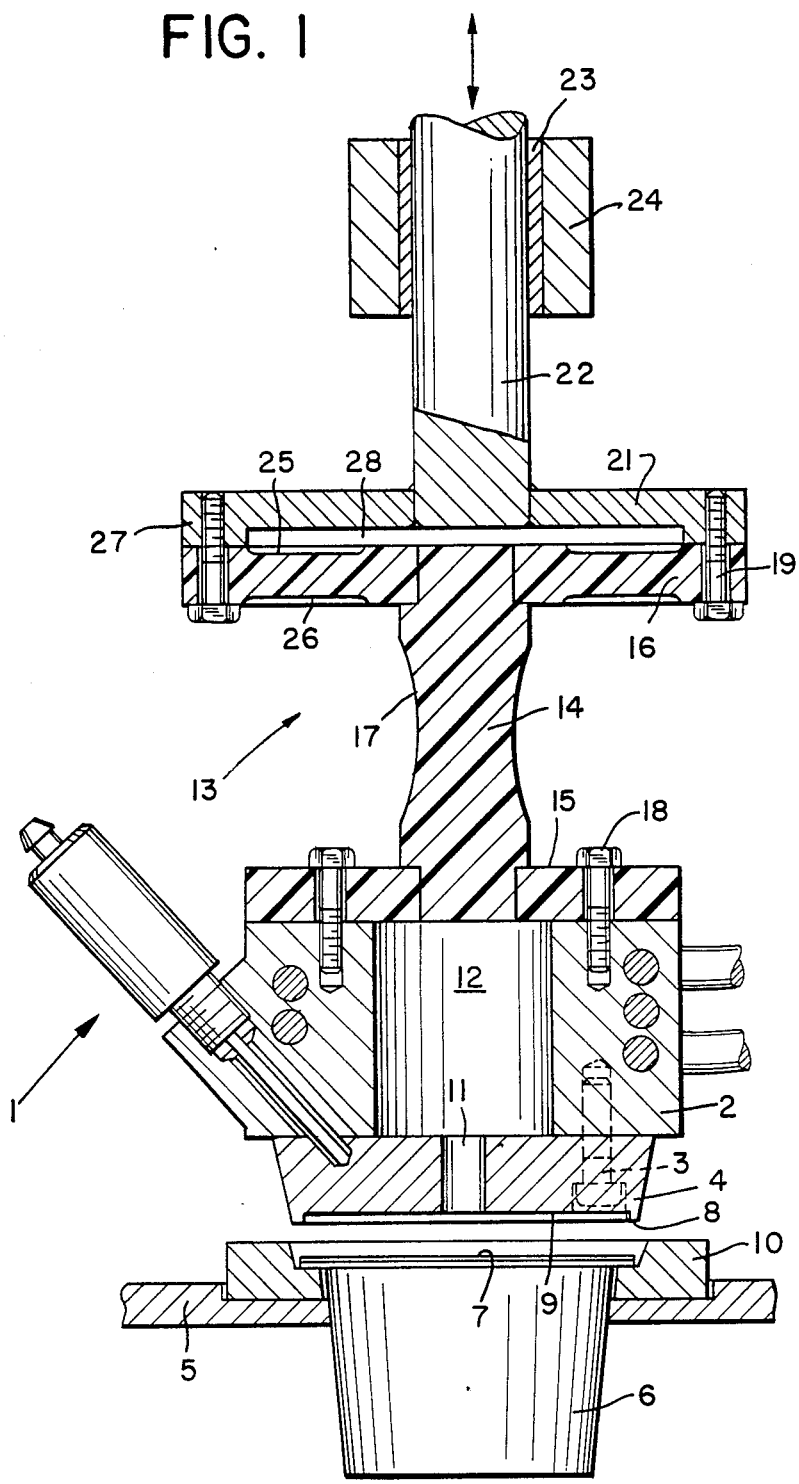
FIG. 1 shows the sealing head mounting of a single, non-illustrated sealing station of a packaging machine is shown in a side elevational, partially cross-sectional view.
Figure 2:
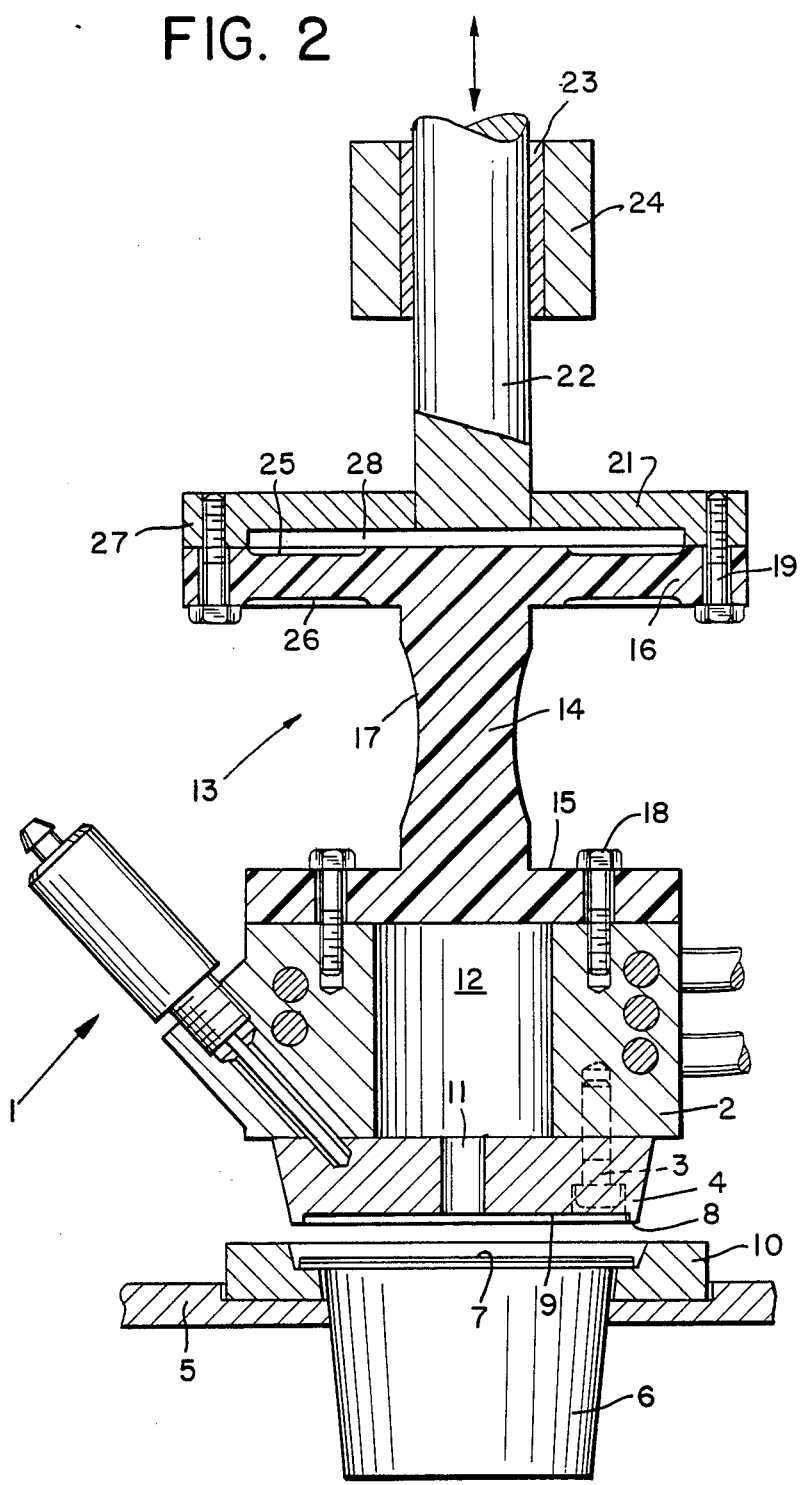
FIG. 2 is a similar view of an alternative embodiment.

There is illustrated in the single Figure of the drawing a sealing station of a packaging machine which is designated with the reference number 1. The sealing installation includes a sealing head 2 which is adapted to be heated to a temperature of about 240° C. A formatting part 4 is secured to one side by means of a plurality of bolts 3. Underneath the formatting part 4 there is disposed a transport chain, e.g., a sheet metal member 5 having a plurality of cells in which there are suspended plastic cups 6. In order to give the plastic cups 6 in the cellular member 5 a precisely centered seating an insert ring 10 is provided in the cellular sheet metal member 5. With the aid of the sealing head, an aluminum foil cover sheet 7 can be sealed onto the edge of the cup in a manner which will be described in detail hereinafter. Thereby a tight sealing of the cup is achieved. The formatting part has a recess 9 surrounded by a sealing edge 8, from which recess 9 a central opening 11 extends into the inner chamber 12 of the sealing head 2, in order to achieve during the sealing operation air compensation.

There is mounted on the sealing head 2 an insulation element 13 on the opposite side from the side on which the formatting part 4 is mounted on the sealing head 2. This insulation element 13 is, e.g., made of amide-imide-polymer, and is formed in the illustrated example of three parts, i.e., a middle part 14, which has a shaft-like shape, and two opposite end receiving parts 15 and 16, which are secured to the middle support part 14. The support part 14 has a narrow middle region 17 and its two opposite cone-shaped ends are shrink-fittingly mounted in corresponding bores of the receiving parts 15 and 16. The receiving part 15 is constructed as a receiving plate and is firmly secured to the sealing head 2 by means of threaded bolts 18. On the opposite side, the receiving part, respectively the receiving plate 16, is secured by means of threaded bolts 19 to the support plate 21. The support plate 21 forms part of a driving arrangement which is not illustrated in detail. The support plate 21 is provided with a central axial support shaft 22 which is slidably mounted in a bushing 23 of a guide element 24. The receiving plate 16 has on opposite sides annular grooves 25 and 26 disposed between the outer edges thereof and the middle shaft regions. These annular grooves 25 and 26 make for a better spring-mounting and adaptation to form and support deviations between the drive mechanism, on the one hand, and the sealing head, on the other hand. For the same reason, the support plate 21 has a circular border flange 27 which is aligned with its inner radial edge with the outer radial edge of the inner groove 25 to thereby define a chamber 28 between the support plate 21 and the receiving plate 16.

MANNER OF OPERATION

The plastic cups 6 are transported by means of the cellular sheet metal member 5 in synchronization with the other operations of the packaging machine in one or a plurality of juxtaposed rows to the sealing station of the packaging machine. There is applied from a non-illustrated feed station aluminum foil cover 7 to the upper side of the plastic cup 6, and by the action of pressure and heat applied via the sealing head 2, respectively the formatting part 3, the cup edge 8 is air-tightly sealed with cover foil 7. For this purpose, the suspended sealing head is moved downwardly onto the plastic cup 6. Any form and position deviations that may appear with respect to the sealing head which is to be aligned with the plastic cup 6 is compensated via the insulating body 13. This is achieved by elastically mounting the receiving plate 16, and the middle portion 14 is bent through and, if need occurs, assumes a skewed position relative to the axis of movement. By means of this compensation, there is provided a flaw-free sealing whereby simultaneously there is secured by means of the insulation body 13 that the heat is drained off in an optimum manner. In this way, the heat of 240° C. in the sealing head 2 is reduced in the drive mechanism to 30° C.

It is, of course, understood that the invention is not limited to the single illustrated embodiment but can, within the spirit of the scope of the claims be considerably revised, e.g., the insulation body 13 can be made in one piece, e.g., by injection moulding. In principle, the arrangement of the invention can also be used in cases when a ring-seal is not provided but, e.g., a point-sealing occurs.

While we have disclosed one embodiment of the present invention, it is to be understood that this embodiment is given by example only and not in a limiting sense.

We claim:

1. A device for sealing packaging containers, in particular plastic cups, by means of a heatable sealing head, comprising a formatted part operatively mounted on said sealing head, a driving mechanism reciprocally slidably mounted in said device for moving said sealing head toward plastic cup, a compensation mechanism having at least one thermal insulating element having a heat resistance of at least 240° C. being operatively mounted in said device between said driving mechanism and said heatable sealing head and being operatively connected to both, said compensation mechanism and said insulating element are formed by an insulating body having opposite axial ends, one of said ends is connected to said sealing head and the other end is connected to said driving mechanism.

2. The device for sealing packaging containers, in particular plastic cups, as set forth in claim 1, wherein said insulating body includes a middle support part of reduced diameter and two opposite end receiving parts, one of said end receiving parts is coaxially connected to said sealing head and the other end receiving part is coaxially connected to said driving mechanism.

3. The device for sealing packaging containers, in particular plastic cups, as set forth in claim 2, wherein said insulating body is constructed as a unitary one-piece body.

4. The device for sealing packaging containers, in particular plastic cups, as set forth in claim 3, wherein said insulating body has a middle support part which is shaft-shaped and the opposite end receiving parts are plate-shaped.

5. The device for sealing packaging containers, in particular plastic cups, as set forth in claim 4, wherein said insulating body is made of synthetic material.

6. The device for sealing packaging containers, in particular plastic cups, as set forth in claim 5, wherein said synthetic material is an amide-imide-polymer.

7. The device for sealing packaging containers, in particular plastic cups, as set forth in claim 5, wherein said insulating body is made of synthetic injection molded material.

8. The device for sealing packaging containers, in particular plastic cups, as set forth in claim 2, wherein said insulating body includes a plurality of parts.

9. The device for sealing packaging containers, in particular plastic cups, as set forth in claim 8, wherein said insulating body includes two round parts which are detachably coaxially connected to each other, said two round parts are in the shape of two round plates, each plate includes an axial bore and a rod is fittingly respectively mounted in each coaxial bore of said two receiving plates.

* * * * *